May 28, 1963 J. A. SCHUFLE 3,091,583
ELECTRODIALYSIS CELL
Filed Oct. 27, 1959 2 Sheets-Sheet 2
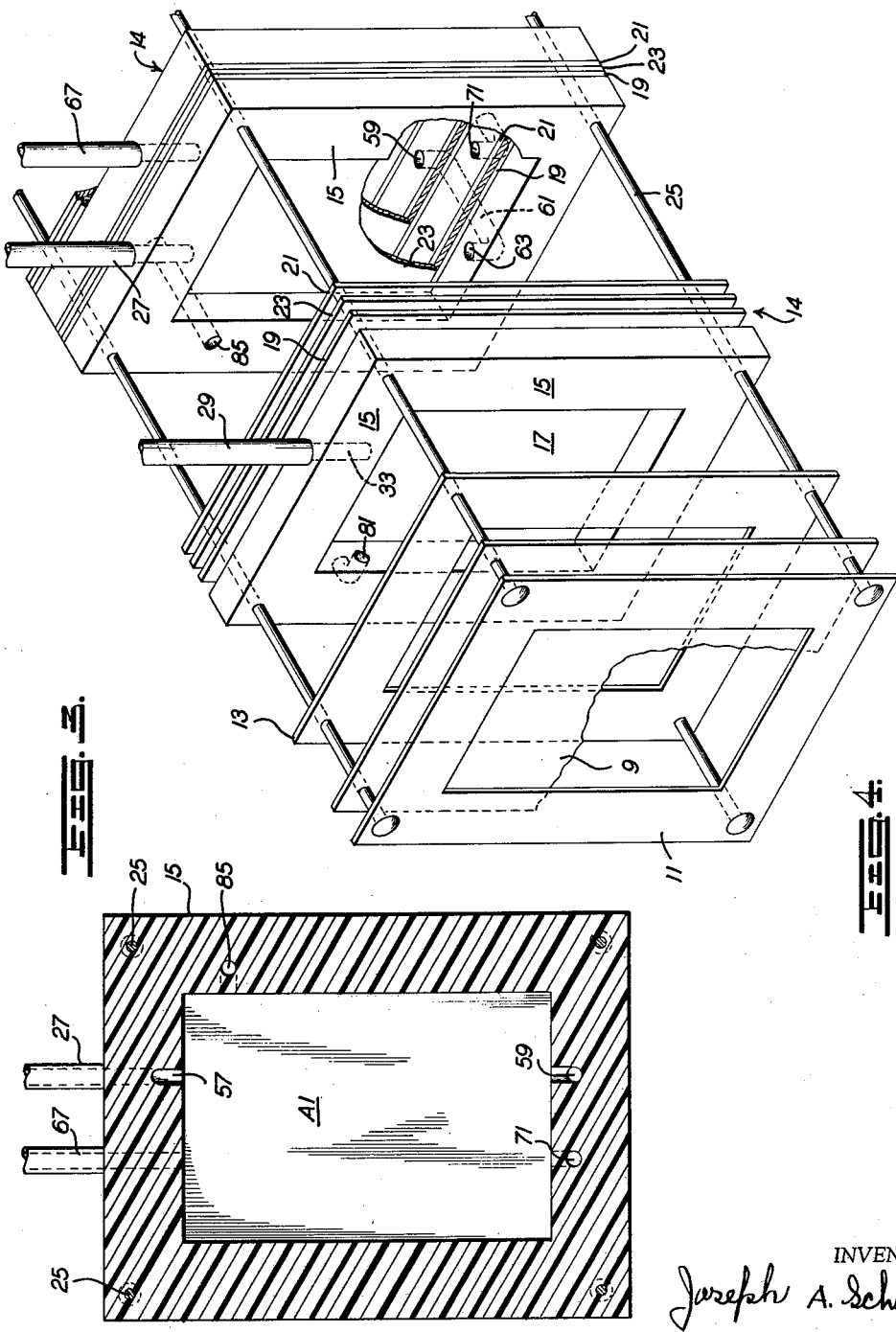
INVENTOR
Joseph A. Schufle
BY Peck & Peck
ATTORNEYS

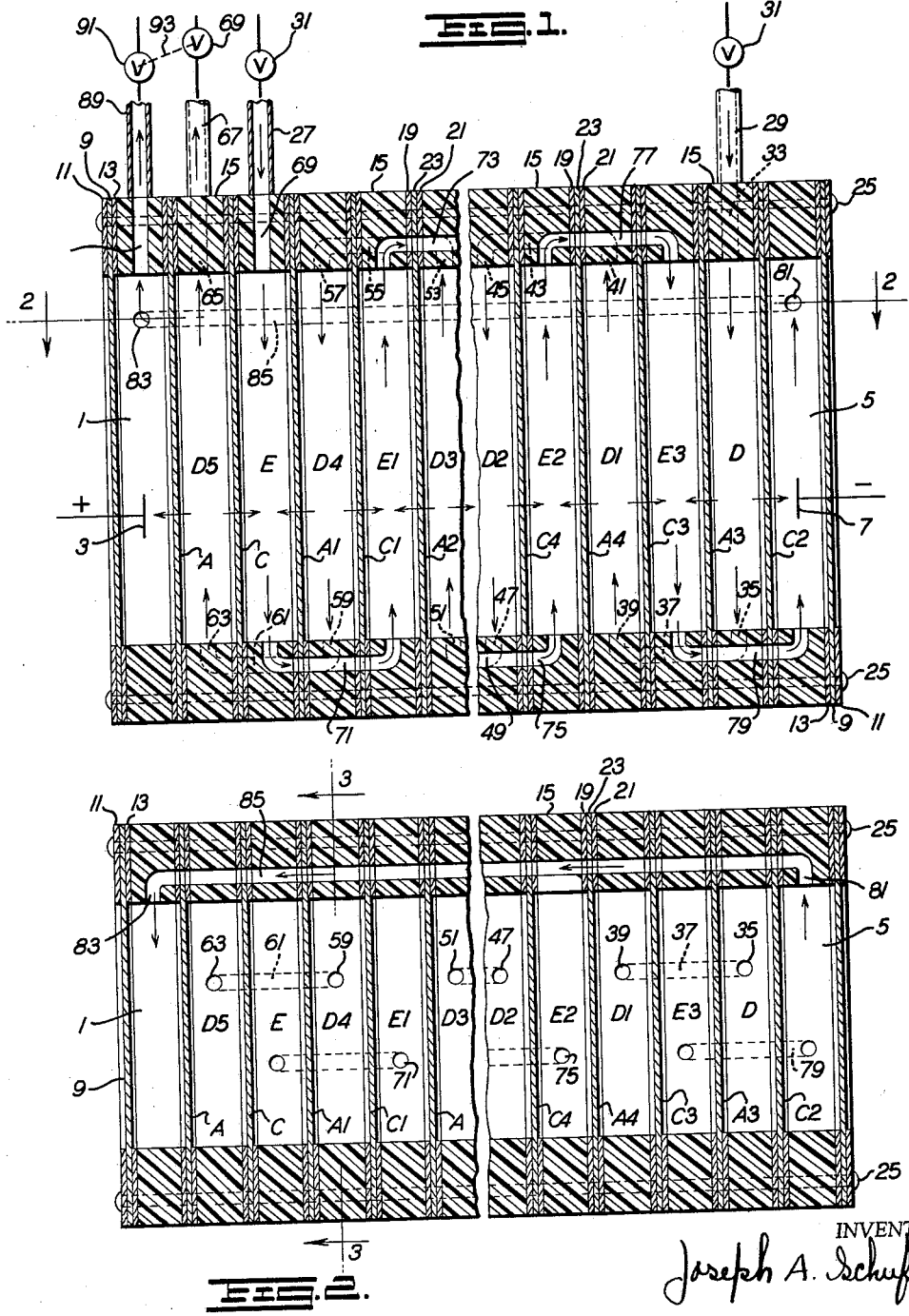

United States Patent Office 3,091,583
Patented May 28, 1963

3,091,583
ELECTRODIALYSIS CELL
Joseph A. Schufle, Socorro, N. Mex., assignor to Aqua' Ionics, Inc., Albuquerque, N. Mex., a corporation of New Mexico
Filed Oct. 27, 1959, Ser. No. 848,958
3 Claims. (Cl. 204—301)

This invention relates broadly to the art of electrodialysis and in its more specific aspect it relates to an electrodialysis cell for the demineralization of water; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

There are basically only two possible methods which may be followed for demineralization of water: (1) remove the water from the salt; (2) remove the salt from the water. The system which I have developed follows the second of these two demineralization methods and my experiments have established that a system wherein the salt is removed from the water is economically attractive and fully efficient for demineralizing moderately saline or brackish water. While my invention is not intended to be limited solely for operation on and treatment of moderately saline or brackish water, it is this field with which I am particularly concerned and the cell which I have devised will be described as demineralizing this general type of water.

The concept which is involved in my development broadly consists in an arrangement whereby the salt in the water is caused to move therethrough in a certain predetermined manner to provide an enriched solution and a water depleted of its mineral content. In accomplishing the desired demineralization I have developed an apparatus providing two flow paths for the solution, the flow paths being contiguous, permeable to the mineral content of the solution but impermeable to the water of the solution. Thus, as will become apparent as this description proceeds, the salt is caused to move from one flow path to the other thereby producing an enriched effluent and a depleted effluent, the former constituting the waste and the latter the potable, usable water.

The salt in the solution which is demineralized in my apparatus is, of course, an electrolyte, and I cause it to move or migrate through the solution in the desired manner by applying a potential gradient thereto, and by the use of ion-exchange membranes which form the dividing walls of the aforementioned flow paths. The use of an electric current and the ion-exchange members make possible the deionization of saline water by electrodialysis.

The ion-exchange members which I use comprise cation exchange members which permit the passage of cations through them but do not permit anions to pass through them, and anion exchange members which permit the passage of anions through them but do not permit the passage of cations.

The electrodialysis cell which I have devised comprises a multi-celled or compartmented apparatus, the cells being serially connected in such manner that two discrete flow paths are provided. Each compartment, chamber or cell of the unit is separated from the next adjacent compartments, chambers or cells by ion-exchange members which are so arranged that one series of compartments will contain the enriched effluent while the other series of compartments will contain the depleted effluent. The flow paths include alternate compartments and the cation and anion exchange members are alternated to accomplish the desired purposes and results.

I am aware that certain of the broad principles I utilize are known in the prior art but I have departed from prior methods and apparatus in several significant areas. For instance, large demineralization units have heretofore been suggested for demineralization of large volumes of water on an "on demand basis." These prior art designs provide very thin cell compartments and large membrane or ion-exchange areas and require relatively large amount of electric power for their operation.

It has been one of my major purposes to provide a small unit, which might be termed "a household unit" for use on relatively small farms, ranches and the like. It is within my contemplation to use the unit with a domestic water system and under such water system pressures and to hold or store the demineralized water within the unit and to draw it therefrom as needed. Thus, this unit provides a constant supply of demineralized water within the unit which not only functions as a demineralizer but also as a water storage receptacle. The prior art apparatus do not function in this manner and are not intended to. In providing the storage feature I have made the compartments of greater capacity than heretofore but in so doing I have not sacrificed economy and efficiency of operation which is, of course, an important factor.

The unit which I have devised is adapted to be connected into a domestic water system and to operate under conventional pressures developed in such systems. It is one of my purposes to provide a closed pressurized unit which may be in constant communication with the domestic or other water system for receiving water therefrom and demineralizing and storing such water. When it is desired to use the demineralized water it is drawn therefrom with the simultaneous withdrawal of an equal volume of enriched effluent or waste and a re-charging of the unit with water to be treated.

It is to be understood that the electrodialysis unit may be supplied with water from any desirable and convenient source and if additional pressure is needed a pump or the like may be used. Hence, the description herein of the apparatus being used with a domestic water system, is merely by way of example and is not to be construed as limiting the scope of use of this invention, or of the invention itself.

The unit of this invention has been designed to, and my experiments indicate that it does, provide substantial economies in operation over prior apparatus of which I am aware. Since the multi-compartmented unit is fed electric current by an electrode disposed at each end and power is present at all times it is important to consume such power only when necessary to cause migration of the cations and anions in the demineralization process. This saving in power consumption in the apparatus of this invention is substantial because when the water is stored in the tank use of power will continue until the depletion is completed at which time current flow through the unit will stop because the resistance of the depleted solution will have reached a high value and current flow will not commence until some of the depleted solution is withdrawn and an equal amount of untreated solution flows into the apparatus.

When the unit is operating resistance will be low due to the fact that the fully enriched solution is caused to flow into each electrode compartment and the compartment adjacent at least one electrode compartment carries the original mineral constaining water. It will be recognized that this arrangement also provides operational economies in the reduction of resistance to current flow through the unit.

As I have mentioned above only two electrodes are necessary for the operation of my unit, one being positioned in a chamber at each end of the unit. In operation gases are formed at the electrodes, $H_2$ being formed at the cathode and $O_2$ or $Cl_2$ being formed at the anode. It is highly desirable to carry off these gases which form at the electrodes and to wash out the electrode chambers. I have evolved an ingenious way of washing away these gases and at the same time increasing the overall conductivity of the cell to reduce the power consumption of the apparatus. I have found that these purposes and results are obtained by using the fully enriched effluent as the electrode washing medium, so that the generated gases are eliminated as waste along with the enriched effluent. This concept results in simplification of the structure of the unit, in its production and in its use. As has been pointed out the system embodied in this apparatus is basically a closed system designed to operate under hydraulic pressures such as are present in a domestic water system. Since it is a closed pressurized system the elimination of the gases along with the enriched effluent solves the problem of accommodating the gases which are generated in the electrode chambers in a simple and efficient manner.

The apparatus of this invention is also effective to produce deionized water (equivalent in quality to distilled water). My experiments have stablished that this apparatus will produce "distilled water" from top water of approximately 150 p.p.m. total solids.

It has been one of my purposes to produce an electrodialysis apparatus which may be produced inexpensively, is sturdy and compact and economical to operate and will require little or no maintenance care.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a vertical sectional view through the electrodialysis cell, with parts thereof broken away.

FIG. 2 is a view taken on line 2—2 of FIG. 1.

FIG. 3 is a view taken on line 3—3 of FIG. 2.

FIG. 4 is an exploded view illustrating the components forming the cell and the assembly thereof.

In the accompanying drawings I have illustrated, as one example, one form of electrodialysis apparatus which is highly effective in the demineralization of water. This apparatus comprises a plurality of compartments, cells or chambers wherein the water treatment takes place, certain of such compartments being designated as D, D1, D2, D3, D4 and D5, and certain other of said compartments being designated as E, E1, E2 and E3, the compartments E, E1, E2 and E3 being alternated with respect to the series of D compartments. At one end of the apparatus I provide an anode chamber 1 in which is mounted the anode 3 and at the other end of the apparatus I provide a cathode chamber 5 in which is mounted the cathode 7.

As will become apparent as this description proceeds the compartments D are serially connected and form the flow path through the apparatus for the depleted effluent or the demineralized water, and the compartments E are serially connected and form the flow path through the apparatus for the enriched effluent. It is significant to recognize, as will be explained, that the electrode chambers 1 and 3 are in communication with the compartments E for flow of enriched effluent through the electrode chambers.

In the example shown in the drawings the apparatus is of generally rectangular shape and may, of course, consist of a greater number or of fewer compartments, depending upon the particular installation, the capacity desired and other factors. The apparatus is assembled to provide a closed system which is under hydraulic pressure from a domestic water system or from any other source of water to be treated.

The apparatus is closed at each end by an assembly which may comprise a rectangular imperforate plate member 9 and a pair of rectangular gaskets 11 and 13. The plate member 9 may be formed of a plastic such as Lucite, or of any other suitable material and the gaskets 11 and 13 may be composed of rubber or any suitable sealing material.

The electrodialysis cell or apparatus is divided into the plurality of compartments D and E by a plurality of assemblies designated generally by the numeral 14, each such assembly being composed of a divider, a pair of gaskets and an ion-exchange member. I have designated each divider element by the numeral 15 and each is a substantially rectangular frame member providing an opening 17. The dividers may be formed of Lucite or any other suitable material which is preferably rust-proof. Each assembly 14 also includes a pair of rectangular gaskets 19 and 21 which conform dimensionally to the dividers 15. Positioned between each set of gaskets 19 and 21 is an ion-exchange member 23 which extends over the opening 17 and forms the major separating medium between the compartments D and E and between anode chamber 1 and compartment D5 and cathode chamber 5 and compartment D. Each of these assemblies is integrated into apparatus forming position by means of four tie rods 25 which extend through apertures which are formed in each corner of each assembly. The tie rods extend beyond the ends of the apparatus and are headed and of a length so that adjacent assemblies are brought into tight engagement and each compartment is sealed from the next adjacent compartment by the gaskets and separated therefrom by the ion-exchange membranes. It will now be apparent that I have provided a closed and sealed unit adapted for operation under hydraulic pressures and one providing a plurality of compartments for flow of water therethrough.

The ion-exchange members 23 constitute membranes which are stretched over the openings 17 in the dividers 15 and are adapted to control the migration of ions from compartment to compartment under the electric charge which is impressed on the electrolyte being treated. The ion-exchange membranes 23 comprise anion permeable membranes and cation permeable membranes alternately located in the demineralizing apparatus. As is known anion membranes permit only the passage of anions therethrough and cation membranes permit only the passage of cations therethrough and anions are attracted to the anode while cations are attracted to the cathode. I have arranged the anion and cation permeable membranes in such a manner that one effluent within the apparatus will be enriched by receiving both cations and anions from the other effluent which will thereby be depleted or demineralized to provide potable usable water.

The anode chamber 1 is separated from the compartment D5 by means of the anion-exchange membrane A while the compartments D5 and E are separated by means of a cation-exchange membrane C, while the compartments E and D4 are separated by an anion-exchange membrane A1 and the compartments D4 and E1 are separated by a cation-exchange membrane C1 and compartments E1 and D3 are separated by anion-exchange membrane A2. Proceeding from the opposite end of the unit it will be seen that the cathode chamber 5 is separated from the compartment D by a cation-exchange membrane C2, while the compartment D is separated from the compartment E3 by an anion-exchange membrane A3 and the compartment E3 is separated from the compartment D1 by a cation-exchange membrane C3, and the compartment D1 is separated from the compartment E2 by anion-exchange membrane A4 and the compartment E2 is separated from the compartment D2 by a cation-exchange membrane C4.

It is to be noted that the anode chamber is separated from the next adjacent compartment by an anion-exchange membrane, while the cathode chamber is separated from the next adjacent compartment by a cation-exchange membrane.

Thus, anion membrane A will permit migration of anions from compartment D5 into anode chamber 1 for the enrichment of the solution therein, while cation membrane C2 will permit migration of cations from compartment D into cathode chamber 5 for the enrichment of the solution therein.

An example of one type of membrane which may be used is "Permutit Anion Exchange Membrane No. 3148" and "Permutit Cation Exchange Membrane No. 3142."

As will be explained more fully hereinafter it is desirable where the compartments are to be used not only for treating compartments but also for storage compartments to increase the width of the compartments and their volumetric capacity. In accomplishing this I form the dividers 15 of substantial thickness to thereby increase the dimension of each compartment longitudinally with respect to the apparatus.

The electrodialysis unit being assembled as described to provide any suitable and desirable number of compartments D and E between the anode and cathode chambers 1 and 5, respectively, to provide a closed pressurized unit, is connected into a pressured water system of any type. The electrodialysis unit has two inlets 27 and 29 which are connected to the water supply which is to be demineralized. Each supply pipe 27 and 29 may be provided with a control valve 31 for controlling the flow of saline or brakish water to the demineralizing unit. I shall term the supply line 29 the "depleted line" that is, the stream of water which will be demineralized and made potable and usable, and the supply line 27 the "enriched line" which will be enriched in saline and will constitute the waste solution from the water treatment.

One of the supplies of water flows into the unit through supply line 29 (depleted line) and through a bore 33 formed through the top section of the divider 15 forming compartment D and into said compartment which is separated from cathode compartment 5 by cation exchange membrane C2 and from enriching compartment E3 by anion exchange membrane A3. The compartment D is in communication with depleting compartment D1 through bore 35 formed in bottom section of that divider 15, the bore 35 extending into a horizontal bore 37 extending through the lower section of the next adjacent divider 15 which is in communication with a bore 39 formed in the lower section of the next adjacent divider 15 and opens into compartment D1. The upper section of divider 15 forming compartment D1 is formed with an outlet bore 41 in communication with horizontal bore 43 in the upper section of the next adjacent divider 15 which in turn communicates with bore 45 emptying into compartment D2. Compartment D2 is connected to compartment D3 by bores 47, 49 and 51 while compartment D3 is connected to compartment D4 by bores 53, 55 and 57. The serial communication of the depleting compartments is continued by connecting compartment D4 with compartment D5 by bores 59, 61 and 63. Compartment D5 in the illustrated example comprises the final depleting compartment so that the water flowing therefrom is potable and usable. I provide a bore 65 through upper section of divider 15 forming compartment D5 which bore is in communication with pure water supply pipe 67 which may be provided with a control valve 69 therein. Thus, water from the supply of water flows in the depleted line through inlet 29, compartments in the D series and out of the unit through bore 65 and outlet pipe 67. It will now be appreciated that the inlet and outlet of each compartment is at opposite ends so that the water being depleted must flow through the full length of each compartment and along the anion and cation membranes.

The water from the source of supply forming the enriched flow line enters the unit through inlet pipe 27 which is in communication with bore 69 in the upper section of the divider 15 forming compartment E, so that this line of untreated water initially flows into compartment E. From compartment E the solution flows through bore 71 formed in the lower sections of adjacent dividers 15 and into compartment E1 and flows out of the top of said compartment through bore 73 and into a further compartment (not shown) from whence it flows through bore 75 into compartment E2 and thence through bore 77 into compartment E3. A bore 79 connects the bottom of compartment E3 with the bottom of cathode chamber 5 for the flow of the completely enriched solution into said chamber. The enriched solution or effluent flows out of the cathode chamber through bore 81 formed in the side of the end divider 15, and each divider 15 between the end dividers is formed with bores in the side which are in alignment and in communication with bore 81 and bore 83 in the other end divider, the bore 83 opening into anode chamber 1. I have designated the continuous bore as 85 which is in communication with bores 81 and 83. The enriched effluent or waste is drawn from anode chamber 1 through bore 87 and pipe 89 which may be controlled by valve 91.

The enriched line of water it will now be understood enters the unit through inlet pipe 27 and duct 69 and flows into compartment E and then into compartments E1, E2, E3 and then through cathode chamber 5 and to anode chamber 1 through bores 81, 85 and 83 and out of the unit through bore 87 and pipe 89.

It will now be understood that each depleting compartment D—D5 is formed by a cation exchange membrane forming the wall toward the cathode chamber while the other wall toward the anode chamber is formed by an anion exchange membrane. Thus, the cations and the anions will migrate into the next adjacent E chambers so that the water as it reaches outlet 67 will be depleted or demineralized while the water flowing in compartments E will be enriched and is caused to flow into the anode and cathode chambers to carry off the gases with the waste enriched effluent. This use of the enriched effluent serves not only as a washing medium but also functions to reduce the resistance at the electrodes and thus reduces the power consumption of the apparatus. The resistance at the electrode chambers is further reduced by placing a cation exchange membrane as the wall of the cathode chamber so that cations may migrate thereinto and by placing an anion exchange membrane as the wall of the anode chamber so that anions may migrate thereinto.

The apparatus may be connected to a source of supply of water to be treated by connecting pipes 27 and 29 thereto. The outlet pipe 67 may carry the depleted, potable and usable water to any point of use and pipe 89 carries the enriched solution or waste to any desired location. With the apparatus connected as described the valves 31 may normally be kept open for flow of untreated water into the apparatus and to maintain the apparatus in pressurized condition, the valves 69 and 91 being closed except when it is desired to withdraw potable water from the apparatus. To withdraw potable water valve 69 is opened and it is preferable that this valve be connected in any suitable manner with the valve 91 (means 93 being schematically shown) so that valve 91 will be automatically opened when valve 69 is opened. With valves 69 and 91 open usable water will be withdrawn through pipe 67 and waste through pipe 89 and the pressure of the water supply system will force water into the apparatus in volume equal to that being withdrawn so that compartments D and E will always be fully charged. The dialysis action which occurs as the water is stored in the compartment will cause depletion of the mineral content in compartments D and D5 thereby raising the resistance of the water in these compartments to a value stopping current flow to thereby conserve electric power.

It is to be understood that my invention is not intended to be limited to the valve arrangement shown or to the connection into a water system as shown for it is within my contemplation to use and to connect this apparatus in various different ways.

I claim:

1. Apparatus for demineralizing water comprising a multi-compartmented cell providing a flow path for demineralized water and a separate flow path for enriched waste water, normally open inlets for supplying pressurized untreated water to each of said flow paths, each of said flow paths being closed and maintained under the pressure of the untreated water a valved outlet from each of said paths and means causing one of said valves to open or close when the other of said valves is opened or closed whereby water will flow in said inlets when said valves are open and will stop flowing when said valves are closed, ion-exchange means separating the flow paths and an electrode positioned in a chamber at each end of the apparatus, the chambers being in communictaion with the water of one of the flow paths, for washing the electrodes in said chambers.

2. An electrodialysis cell comprising two separate series of compartments providing two closed systems, one series adapted to contain an enriched solution and the other series adapted to contain depleted solution and the compartments of one series being alternately positioned within the cell with respect to the compartments of the other series, and the compartments of one series being in communication and the compartments of the other series being in communication, one compartment of each series having an inlet for flow of solution to be treated into said compartment and thence serially through the other compartments of each series, means for causing the solution to flow through each of said series of compartments under pressure and to be maintained therein under pressure, and said series adapted to contain the depleted solution having an outlet provided in the compartment thereof remote from said compartment of said series having the inlet therein, an anode positioned in a chamber at one end of said cell and a cathode positioned in a chamber at the other end of said cell, and said series adapted to contain the enriched solution having an outlet in the compartment thereof remote from said compartment of said series having the inlet therein, said last named outlet being in communication with one of said chambers for flow of enriched solution therethrough and said other chamber being in communication with said one of said chambers for flow of enriched solution therefrom and into said other chamber, and said other chamber having an outlet for flow of enriched solution and the gas generated in both of said chambers from the cell, and ion-exchange membranes separating adjacent compartments and the end compartments from said chambers, and means for mounting said ion-exchange membranes.

3. An electrodialysis cell comprising two separate series of compartments, the compartments of one series being alternately positioned within the cell with respect to the compartments of the other series, and the compartments of one series being in communication and the compartments of the other series being in communication, a first compartment of each series being provided with an inlet for receiving solution under pressure to be treated for flow of the solution under pressure through the compartments, one series of compartments adapted to contain the enriched solution and the other series of compartments adapted to contain the depleted solution, an anode positioned in a chamber at one end of the cell and a cathode positioned in a chamber at the other end of the cell, ion-exchange membranes separating adjacent compartments and the end compartments from said chambers and means for mounting said ion-exchange membranes, and means connecting the final compartment of said series of compartments adapted to contain the enriched solution with said chambers for flow of the fully enriched solution therein to wash the electrodes and to reduce the resistance of the solution at the electrodes, and said last named means constituting the sole outlet for the fully enriched solution from said series of compartments, and said cell being provided with outlets for flow of depleted and enriched solutions therefrom.

References Cited in the file of this patent
UNITED STATES PATENTS

| | | |
|---|---|---|
| 2,796,395 | Roberts | June 18, 1957 |
| 2,937,126 | Rosenberg | May 17, 1960 |

FOREIGN PATENTS

| | | |
|---|---|---|
| 499,634 | Italy | Nov. 15, 1954 |

OTHER REFERENCES

Winger: "Industrial and Engineering Chem.," vol. 47, No. 1, January 1955, pages 50–51 relied upon.

"Chemistry and Industry," January 4, 1958, pages 8–13.